US012601630B2

(12) United States Patent　　　(10) Patent No.:　US 12,601,630 B2
Cowper　　　　　　　　　　　　　　(45) Date of Patent:　Apr. 14, 2026

---

(54) VEHICLE-RELATED EVENT DETECTION USING SIGNAL PROCESSING

(71) Applicant: AGM TECHNOLOGIES LIMITED, Elborough (GB)

(72) Inventor: Stephen William Cowper, Suffolk (GB)

(73) Assignee: AGM TECHNOLOGIES LIMITED, Elborough (GB)

( * ) Notice: Subject to any disclaimer, the term of this patent is extended or adjusted under 35 U.S.C. 154(b) by 90 days.

(21) Appl. No.: 18/394,542

(22) Filed: Dec. 22, 2023

(65) Prior Publication Data

US 2024/0210236 A1　　Jun. 27, 2024

(30) Foreign Application Priority Data

Dec. 22, 2022　(GB) ...................................... 2219594

(51) Int. Cl.
*G01H 3/06*　　　(2006.01)
*G01H 1/00*　　　(2006.01)
(Continued)

(52) U.S. Cl.
CPC ................. *G01H 3/06* (2013.01); *G01H 1/00* (2013.01); *H04R 1/028* (2013.01); *H04R 1/08* (2013.01);
(Continued)

(58) Field of Classification Search
None
See application file for complete search history.

(56) References Cited

U.S. PATENT DOCUMENTS 6,087,960 A　*　7/2000　Kyouno ................... G01H 3/06
　　　　　　　　　　　　　　　　　　　　　340/916
11,601,542 B1 *　3/2023　Veloso ................ H04M 1/6075
　　　　　　　　(Continued)

OTHER PUBLICATIONS

United Kingdom Intellectual Property Office, "Search Report under Section 17(5)," mailed Jun. 23, 2023, for U.K. Application No. GB2219594.5, 3 pages.
(Continued)

*Primary Examiner* — Peter D Nolan
*Assistant Examiner* — Jacob Kent Besteman-Street
(74) *Attorney, Agent, or Firm* — Dorsey & Whitney LLP

(57) ABSTRACT

There is provided a method of, and a corresponding system for, detecting an event related to vehicle integrity, such as an oblique angle or side swipe type crash. The method may include using a microphone to transduce sound into an analog audio signal, and then using an analog signal processor analogically transforming said analog audio signal in the time-frequency domain, including dividing the audio signal into a plurality of time segments, and each time segment into a plurality of signal components in a plurality of predetermined frequency bands. Such time-frequency spectrogram can be evaluated by the signal processor in order to detect vehicle integrity-related events. Accordingly, the system only requires ultra-low power, since no (analog) to digital conversion is required. This is advantageous in applications such as battery powered continuous vehicle monitoring. The method may also be carried out recurring to digital signal processing, that is in the digital domain.

26 Claims, 12 Drawing Sheets

(51) Int. Cl.
>   *H04R 1/02*          (2006.01)
>   *H04R 1/08*          (2006.01)
>   *H04R 3/04*          (2006.01)

(52) U.S. Cl.
>   CPC ........... *H04R 3/04* (2013.01); *H04R 2430/03*
>                (2013.01); *H04R 2499/13* (2013.01)

(56)                    References Cited

U.S. PATENT DOCUMENTS

| | | | |
|---|---|---|---|
| 2010/0201819 A1* | 8/2010 | Minowa ............... | G07C 5/0891 |
| | | | 348/148 |
| 2017/0222612 A1* | 8/2017 | Zollner .................... | H04R 3/12 |
| 2018/0108187 A1* | 4/2018 | Kosubek ................ | G07C 5/006 |
| 2018/0140233 A1* | 5/2018 | Lacirignola .......... | A61B 5/6814 |
| 2019/0220248 A1* | 7/2019 | Cordourier Maruri ..................... | |
| | | | G06F 3/167 |
| 2021/0125428 A1* | 4/2021 | Tedesco ............... | G07C 5/0808 |
| 2021/0380059 A1* | 12/2021 | Jones .................... | B60W 50/14 |
| 2021/0387584 A1* | 12/2021 | Daniels ................. | G06V 20/58 |
| 2023/0017323 A1* | 1/2023 | Oomen .................. | H04S 5/005 |
| 2023/0147781 A1* | 5/2023 | Timofejevs ............. | G10L 25/51 |
| | | | 704/232 |
| 2024/0298108 A1* | 9/2024 | Littrell ................... | H04R 1/326 |

OTHER PUBLICATIONS

United Kingdom Intellectual Property Office, "Combined Search and Examination Report under Sections 17 and 18(3)," mailed Jun. 18, 2024, for United Kingdom Application No. GB2319981.3, 7 pages.

\* cited by examiner

Server Side
Filtering of Events

28

29

2 Real Crashes sent to client

Ratio of power in the highest frequency band is almost 1000x – giving a strong signal to check for

FIG. 12a          FIG. 12b

VEHICLE-RELATED EVENT DETECTION USING SIGNAL PROCESSING

TECHNICAL FIELD

The present application relates to a method of detecting vehicle integrity-related events, such as vehicle collisions, which uses digital and/or analog signal processing. In particular, the present method may use only analog signal processing, and therefore the method may be ultra-low power, as discussed further below. The present application also relates to apparatus and/or to a system for carrying out said method.

BACKGROUND

The detection of events, and in particular low-speed vehicle collisions, is an area that has generated a significant amount of interest. WO 2014/049352 A1 discloses a vehicle incident detection system comprising a vehicle, an accelerometer assembly mounted on the vehicle for measuring acceleration along an axis, a vibration sensor rigidly connected to a structural component of the vehicle and a signal processing module connected to the vibration sensor and accelerometer assembly for receiving first and second respective signals therefrom, and configured to detect an incident if a magnitude of the first signal exceeds a first threshold. An event management module is configured to store data from the accelerometer assembly and vibration sensor and data relating to the status of the vehicle on detection of the incident by the signal processing module. However, there are still a significant number of vehicle collisions which are not currently detectable, and this may lead to significant losses for insurance companies and vehicle operators, whilst leaving open the opportunity for organized fraud to take advantage of these 'blind spots'.

The present disclosure sets forth a method, and related apparatus and/or system, which have the potential of significantly reducing the number of collisions that existing systems and methods fail to detect. This is accomplished using a novel approach which, as we will see below, has the potential of being categorized as 'ultra-low power', and therefore suitable for being 'always on', for example for capturing incidents which occur when a vehicle is in an unused status. In more detail, the present disclosure brings forwards features such as:

1. 'Always On' Crash Detection. Vehicles being hit while parked make up a significant proportion of insurance claims and, typically, crash detection systems are unable to detect these events when the vehicles are parked beyond a few hours, as the prior art devices tend to go into deep sleep to conserve power and so are not able to detect the events.

2 'Anti-Theft Vehicle Security' whilst parked, covering events such as broken glass or physical attack with angle grinders to doors or catalytic converters (or other vehicle components).

STATEMENT OF INVENTION

According to an aspect of the present disclosure, there is provided a method of detecting an event related to vehicle integrity, the method comprising:

providing a microphone associated to a vehicle, preferably located inside said vehicle, such as within a cabin of said vehicle;

using said microphone, continuously generating an audio signal, and preferably an analog audio signal;

providing a signal processor (and preferably an analog signal processor) also associated to said vehicle, and microphone, also preferably located inside said vehicle, just like said microphone;

using said (analog) signal processor, computing a time-frequency spectrogram of said analog audio signal, wherein said computing comprises dividing said analog audio signal into a plurality of time segments, and decomposing said time segments of the (analog) audio signal into a plurality of signal components in predetermined frequency bands; and, evaluating said time-frequency spectrogram to detect said vehicle integrity-related event. Of course, the signal may be processed in the analog domain or in the digital domain, depending on the application. In addition, it is conceivable that part of the processing may be done in the analog domain, and another part of the processing may be done in the digital domain. Digital signal processing (DSP) may be preferably omitted altogether, with the computation only happening in the analog domain. Remaining in the analog domain is preferred, since due to the analog processing of the audio signal, the method may use ultra-low power, and may therefore be suitable for continuous (that is 'always on') detection. Further, the method can be adapted to reduce and/or eliminate any false positives.

Said predetermined frequency bands may be non-overlapping and sequentially disposed within the frequency range 0 to 22.5 kHz. Optionally, said frequency bands are centered at one or more of: 1.25 KHz; 3.75 KHz; 7.5 kHz; 12.5 kHz and 18.5 kHz. Accordingly, the frequency range of interest can be adequately monitored.

Said computing a time-frequency spectrogram may comprise calculating a power spectral density for each of the plurality of time segments and signal components, which is a particularly effective parameter for differentiating between presence or absence of an event of interest.

Said computing a time-frequency spectrogram may comprise, for each signal component, normalizing said calculated power spectral density to a respective value of power spectral density pertaining to a selected time segment of the analog audio signal before the vehicle integrity-related event, to account for any background noise. Optionally, said selected time segment is the same for all signal components, which provides for simplicity and parametrical adaptability.

Said dividing the analog audio signal into a plurality of time segments may advantageously be performed in parallel on the same analog audio signal according to at least two temporal windows having different duration, such as 20 ms and 500 ms, so that more or less rapidly transient events may be better discerned, comparatively.

Said decomposing the time segments of the analog audio signal into a plurality of signal components in predetermined frequency bands may comprise analog band-pass filtering, wherein said analog band-pass filtering may be centered around any one or more of the following centre frequencies: 1.25 KHz; 3.75 KHz; 7.5 kHz; 12.5 kHz and 18.5 kHz. This conditioning increases the reliability of the detection method.

Said evaluating the time-frequency spectrogram to detect said vehicle integrity-related event may comprise detecting a peak for each time segment and/or signal component of the analog audio signal. Peaks may correlate particularly well to the onset of an event of interest. Said detecting a peak may be carried out in connection with a relatively shorter temporal window.

Said evaluating the time-frequency spectrogram to detect said vehicle integrity-related event may comprise low-pass filtering and amplifying each time segment and/or signal component of the analog audio signal, to also increase the reliability of the detection method. Optionally, the associated low-pass filter and gain settings vary depending on the frequency band associated with the evaluated signal component. Said low-pass filtering and amplifying may be carried out only in connection with a relatively longer temporal window.

Said evaluating the time-frequency spectrogram to detect said vehicle integrity-related event may comprise comparing the peaks detected in connection with the relatively shorter temporal window with the peaks detected in connection with the relatively longer temporal window. Comparing said peaks may comprise determining whether a difference between said peaks exceeds a predetermined threshold. Said predetermined threshold may vary depending on the frequency band associated with the evaluated signal component.

Said evaluating the time-frequency spectrogram to detect said vehicle integrity-related event may further comprise logically selecting one or more signal components corresponding to one or more relatively higher frequency bands. Optionally, detection may be performed if and only if said difference exceeds said predetermined threshold for each selected signal component.

The method may further comprise providing acoustic reference data for carrying out said evaluating. The method may further comprise updating said acoustic reference data, for example by supplying an acoustic feed-forward parameter representative of a specific vehicle integrity-related event.

The method may further comprise:

providing an accelerometer, and preferably a three-axis accelerometer, and more preferably a six-axis Inertial Motion Unit, also associated to said vehicle, microphone and analog signal processor;

using said accelerometer, generating analog inertial data related to motion of the vehicle; and, using the analog signal processor, assessing said inertial data to detect said vehicle integrity-related event.

The method may further comprise providing inertial reference data for carrying out said assessing. The method may further comprise updating said inertial reference data, for example by providing an inertial feed-forward parameter representative of a specific vehicle integrity-related event.

The method may further comprise:

providing a vibration sensor rigidly mounted to a structural element of the vehicle, such as, but not limited to, a glass of the vehicle (for example, the vehicle's main front glass or windscreen), or pillar of the vehicle's cabin, and preferably a piezoelectric vibration sensor (though other types of vibration sensors can of course in principle be used);

using said vibration sensor, generating analog vibration data related to vibration of the vehicle; and, using the analog signal processor, assessing said vibration data to detect said vehicle integrity-related event.

The method may further comprise providing vibrational reference data for carrying out said assessing. The method may further comprise updating said vibrational reference data, for example by providing a vibrational feed-forward parameter representative of a specific vehicle integrity-related event.

In a preferred implementation, said vehicle integrity-related event is confirmed and/or recorded as having taken place only if both the assessments of the audio and vibration data carried out by the analog signal processor are positive, i.e. both of said assessments have independently detected said vehicle integrity-related event. False positives may therefore accordingly be reduced even further.

The method may further comprise categorizing the detected vehicle integrity-related event. The method may further comprise outputting one or more feedback parameters for updating said evaluating the time-frequency spectrogram.

According to another aspect of the present disclosure, there is provided an apparatus for detecting an event related to vehicle integrity, the apparatus being adapted to carry out a method as described herein, and comprising:

a microphone associated to a vehicle, and optionally located inside said vehicle, such as inside a passenger cabin of the vehicle, said microphone being adapted to continuously generate an analog audio signal; and an analog signal processor also associated to said vehicle, and microphone, also optionally located inside said vehicle, optionally inside said vehicle's cabin, said analog signal processor being configured to:

compute a time-frequency spectrogram of said analog audio signal, wherein said computing comprises dividing said analog audio signal into a plurality of time segments, and decomposing said time segments of the analog audio signal into a plurality of signal components in predetermined frequency bands; and, evaluate said time-frequency spectrogram to detect said vehicle integrity-related event.

According to another aspect of the present disclosure, there is provided a telematic device for continuous vehicle monitoring for insurance purposes, the telematic device comprising an apparatus as described herein.

According to another aspect of the present disclosure, there is provided a telematic system comprising a telematic device as described herein.

According to another aspect of the present disclosure, there is provided a vehicle comprising an apparatus as described herein, or a telematic device as described herein, preferably wherein said apparatus or telematic device are located inside said vehicle, more preferably inside a passenger cabin.

DRAWINGS

Illustrative implementations will now be described, by way of example only, with reference to the accompanying drawings. In the drawings:

FIG. 12a shows a system comprising an analog microphone, an analog vibration sensor, a printed circuit board and an analog signal processor in the form of a Reconfigurable Analog Modular Processor (RAMP™), as described herein;

FIG. 12b is a variation of the arrangement of FIG. 12a, showing the analog signal processor of FIG. 12a coupled to a telematic transmitting device, as described herein;

Figure 13:
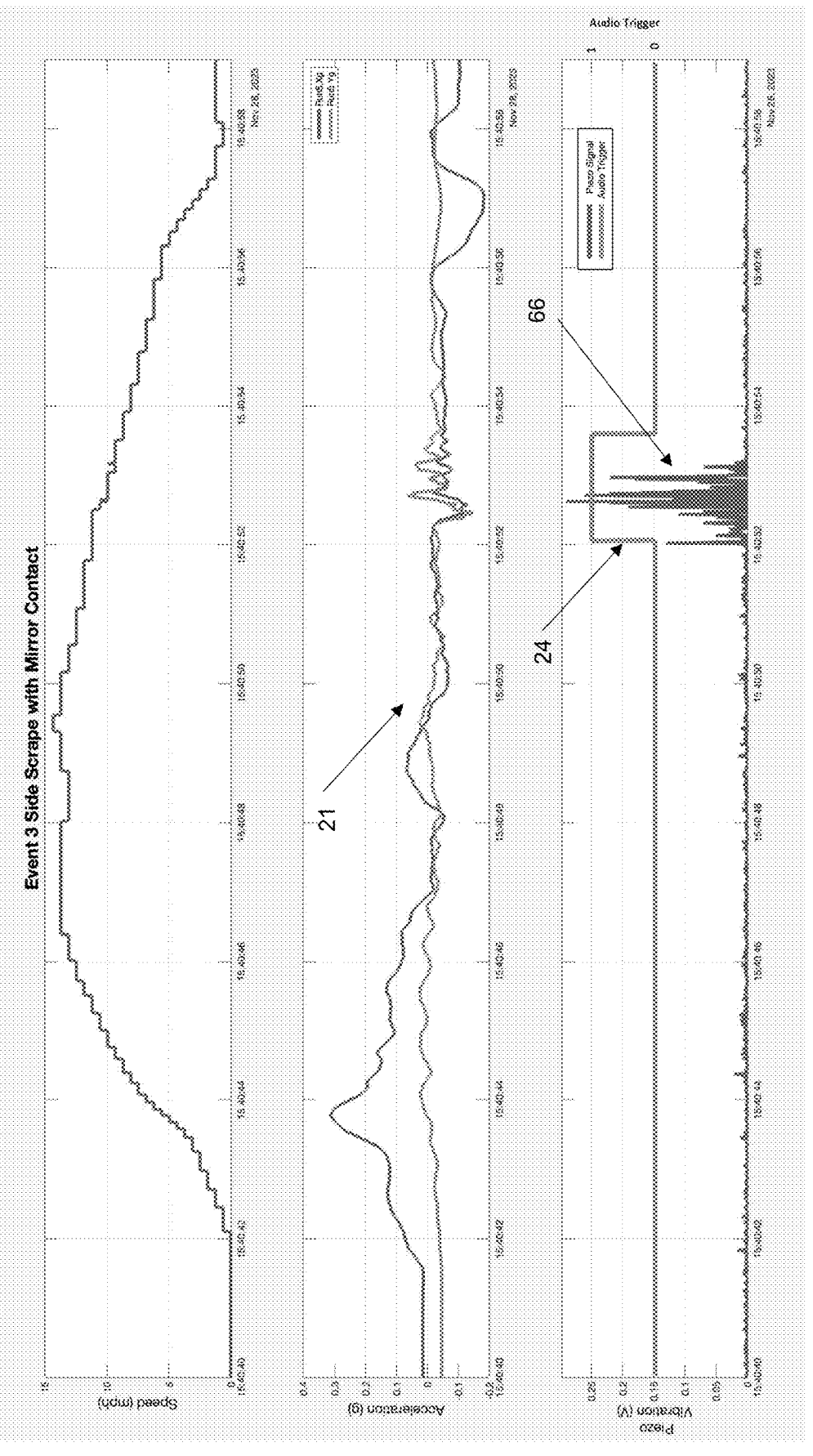
Figure 14:
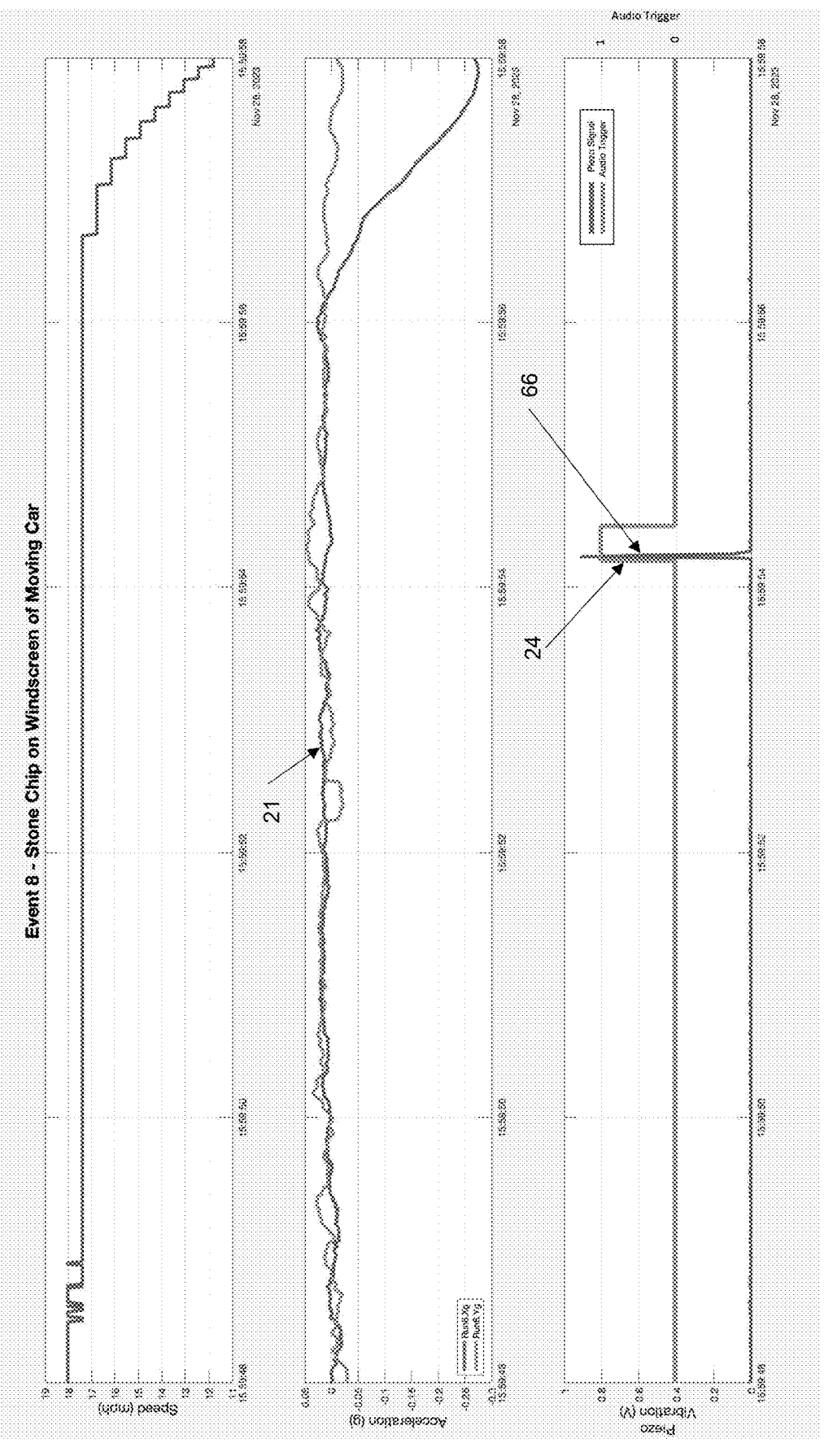

FIG. 13 shows speed, acceleration (in the X and Y directions) and vibration signals recorded during a side-scrape-with-mirror-contact vehicle integrity-related event; this Figure also shows detection of the event by the processing of the analog audio signal described herein; and, FIG. 14 shows speed, acceleration (in the X and Y directions) and vibration signals recorded during a stone-chip-on-windscreen-of-moving-car vehicle integrity-related event; this Figure also shows detection of the event by the processing of the analog audio signal described herein.

Throughout the description and drawings, like reference numerals will be used to refer to like features.

DETAILED DESCRIPTION

Taking the motor insurance use case first, in the UK alone, the Association of British Insurers reports that there were over three million motor-insurance claims in 2018. In the same year, the UK Government STATS-19 report showed 122,635 incidents in which one or more people were killed, seriously injured or slightly injured, where the incidents were sufficiently severe to be reported to the police. This suggests that most of the insurance claims are not of sufficient severity to contribute to the STATS-19 list and are, therefore, potentially not able to be detected by conventional crash-detection solutions. This tallies with user-experience across a range of telematic devices with crash detection capability (one is shown in FIG. 12b, for example), where the number of events positively detected is only a small fraction of the overall number of collisions.

Figure 1:
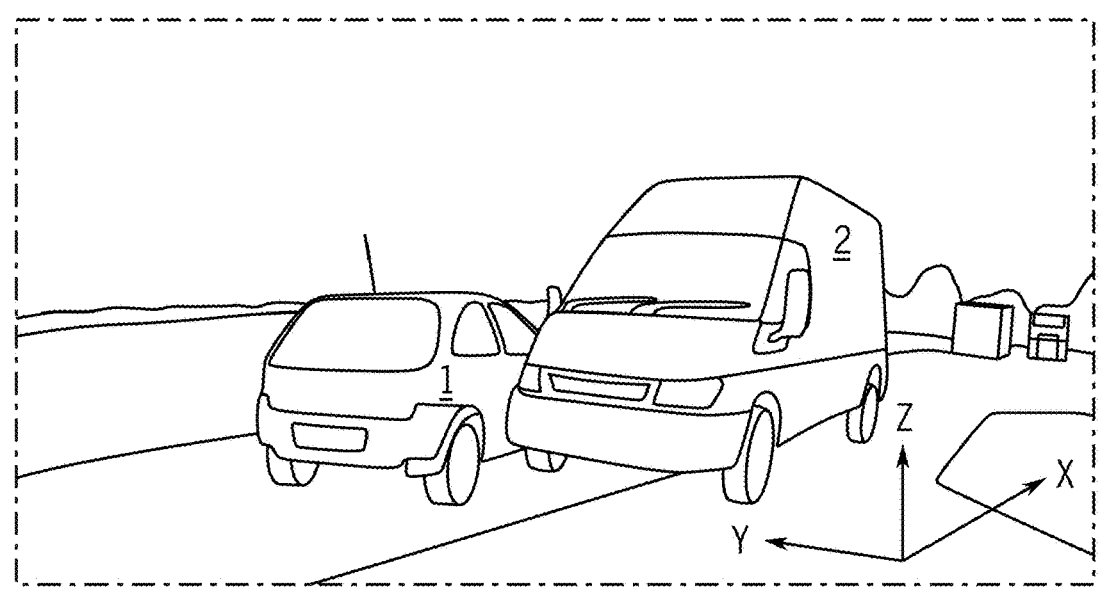
FIG. 1 shows two vehicles engaged in a slow speed, oblique-type crash event.

An example of one large category of collision events which remains undetected is the "oblique-angle" type of crash where one vehicle hits another vehicle at a shallow angle. FIG. 1 shows an example from full-scale vehicle testing undertaken under controlled conditions within the Transport Research Laboratory in the UK, where a Ford Transit van 2 impacts at a speed of 5 mph a smaller, stationary Vauxhall Corsa 1. This type of impact can cause significant damage, as well as cost, for an insurer, especially with the increase in sensors used for Advanced Driver Assistance Systems (ADAS), which may be provided in any damaged parts of the vehicle, and which have increased the cost of a simple repair tenfold in some cases, especially if the sensors need to be recalibrated. FIG. 1 also shows an X, Y and Z reference system, which is used in connection with FIG. 2.

Figure 2:
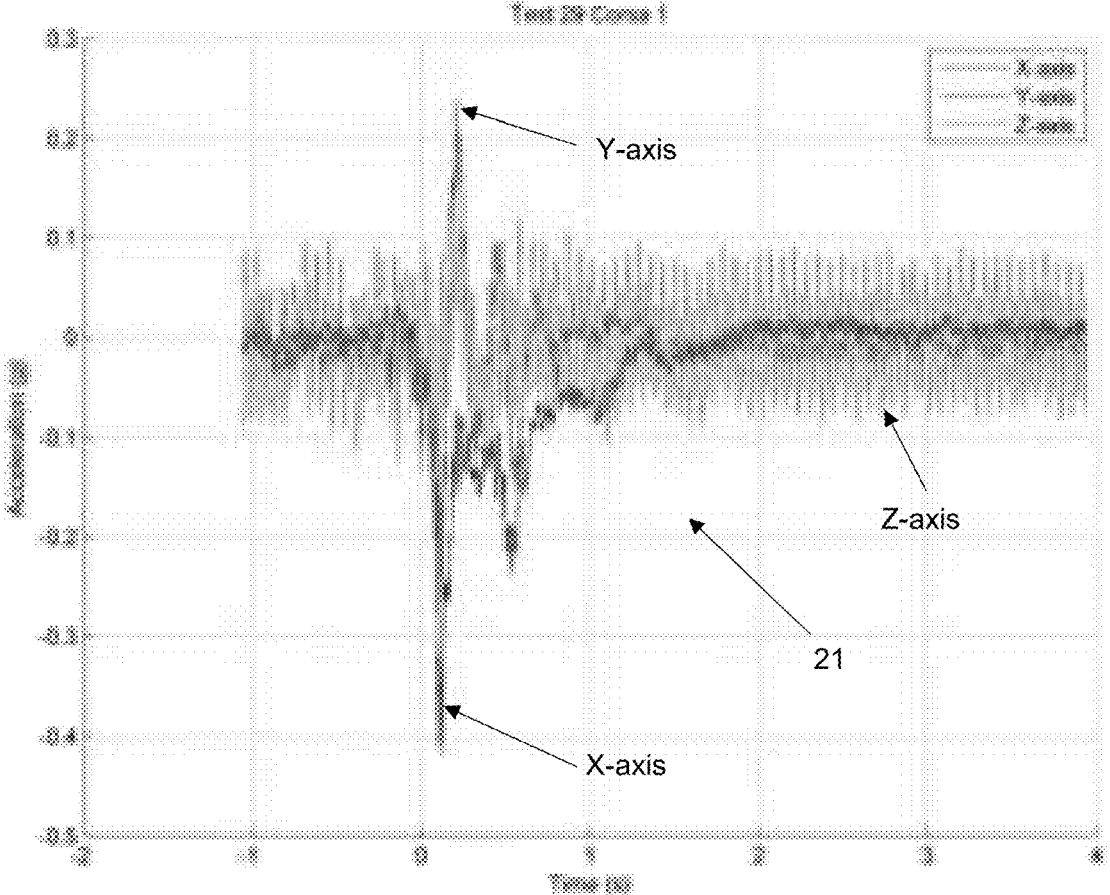
FIG. 2 shows X, Y and Z-axis acceleration signals recorded during the crash of FIG. 1.

FIG. 2 shows three analog traces that relate to a three-axis accelerometer provided inside the Vauxhall Corsa 1 as it is impacted by the Ford Transit van 2. Unlike most other crash types which have a typical duration measured in relation to the maximum force generated by the crash on the vehicle which ranges between 60 and 150 milliseconds (ms), this crash takes place over an extended period of over 1 second (s). The peak magnitude of the force exchanged between the two vehicles 1, 2 as measured by the three-axial accelerometer is also significantly lower, at only around −0.4 g in this case, along the X-axis of FIG. 1, compared to the case of other types of crashes, as the energy of the impact is spread out over a much longer time period. As shown in FIG. 2, this peak force is measured by the X-axis signal of the three-axis accelerometer. To complicate detection even further (that is, in addition to the peak force being relatively low), the force-over-time function (as measured by the accelerometer) can share many characteristics with a typical hard braking event. Accordingly, most crash detection algorithms deployed for vehicles in the prior art rely on detecting a peak acceleration above a certain threshold, typically 2 to 2.5 g, thus avoiding a large number of false positives 26 (these are shown, for example, in FIG. 3) from normal driving. However, this only helps to explain why so many events of similar, lesser magnitude are missed. The present disclosure sets out to solve this problem.

Figure 3:
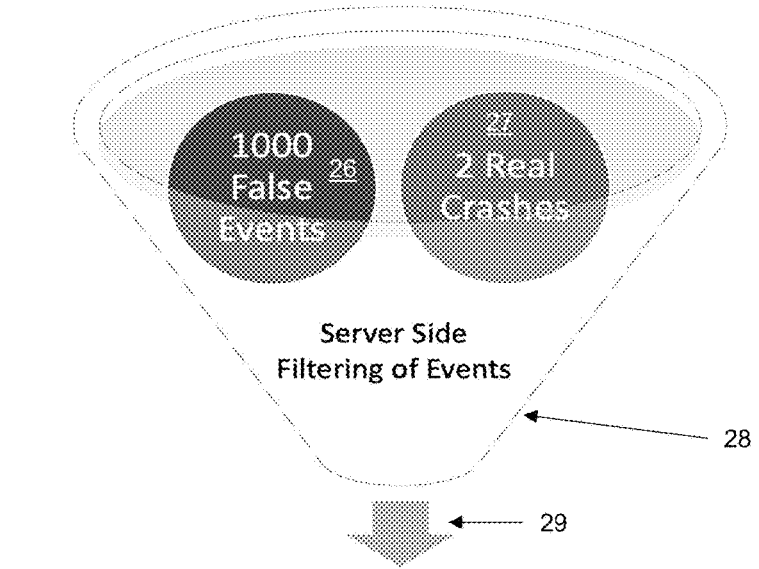
FIG. 3 illustrates the problem of false crash detections (i.e. false positives)

Whilst it is possible to reduce the detection thresholds in relation to the accelerometer's output, this would not be efficient, as FIG. 3 shows. FIG. 3 shows that reducing detection thresholds in the prior art means that an associated telematic system (such as a telematic device of the kind commonly used for continuous monitoring of vehicles for insurance purposes, one such device 32 being shown in FIG. 12b, for example) would generate an excess of false events 26, caused by potholes, road imperfections, speed bumps, mini roundabouts, hard braking and accelerating, etc. . . . . These false positives 26 (for example, these could be as many as 1000 in a unit time, as also represented in FIG. 3) may overwhelm any rarer actual crash events 27 (for example, only 2, in the unit time, as also shown in FIG. 3). With telematics systems configured in this way, every false detection event 26 (i.e., a false positive) instigates unnecessary energy consumption by the system transmitting 'detection' to the dedicated servers. This is not very sustainable, due to limitations in server storage and related energy requirements. Further, on the servers, any false detection events 26 require further filtering 28 so that only the real events 27 are eventually logged by the system and sent 29 to the client.

Figure 4:
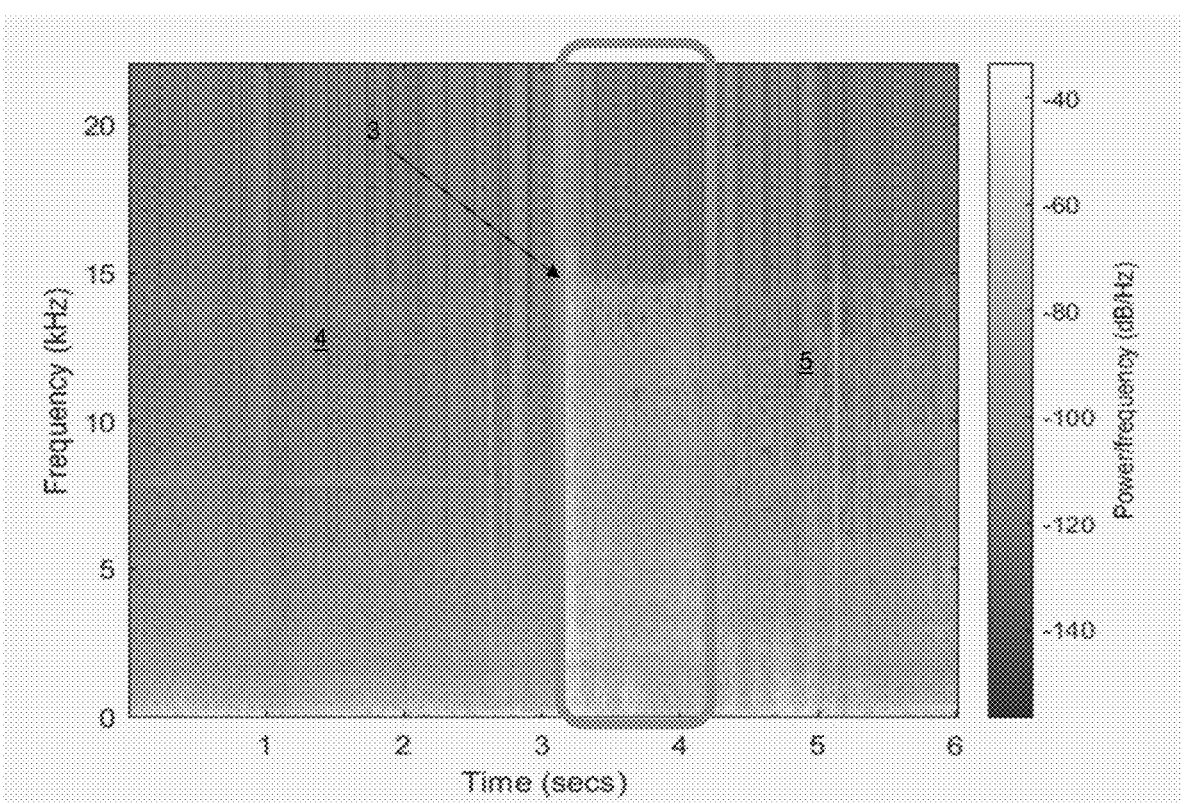
FIG. 4 shows a time-frequency spectrogram typical of sound recorded inside a vehicle before, during and after an oblique-type collision event between two vehicles, similar to that of FIG. 1.

A preferable approach is now introduced with reference to FIG. 4. Provided that an 'on-device' filtering could be achieved without consuming significant power (this can be achieved if the processing is done analogically; however, it will be appreciated that the same method could alternatively be carried out in the digital domain, if an appropriate power source was provided), this may reduce the number of false events 26 to a manageable level. In order to detect difficult events such as oblique-type impacts, the present disclosure takes advantage from the physical phenomenon that sound generated by impacts tends to have a particularly wide frequency spectrum. As the spectrogram in FIG. 4 shows, during the time period 3 in which the impact occurs, there is a wideband burst of acoustic energy across a wide range of frequencies, ranging from 0 to well above 15 kHz, generally in the audible spectrum, or slightly above. In the region 4 of the spectrogram of FIG. 4 before the crash, the sound tends to have only lower frequency components, especially between 0 and about 2.5 kHz (lower audible spectrum). In the region 5 after the crash (that is, from a time when there is no longer contact between the two vehicles), the sound has higher frequencies compared to the region 4 prior to the crash (in more detail, contained in the range of 0 to about 5 kHz), but not as high, on average, as during the crash. In FIG. 4, as it can be appreciated, the crash happens just after 3 seconds with a duration of a little over 1 second.

Figure 5A:
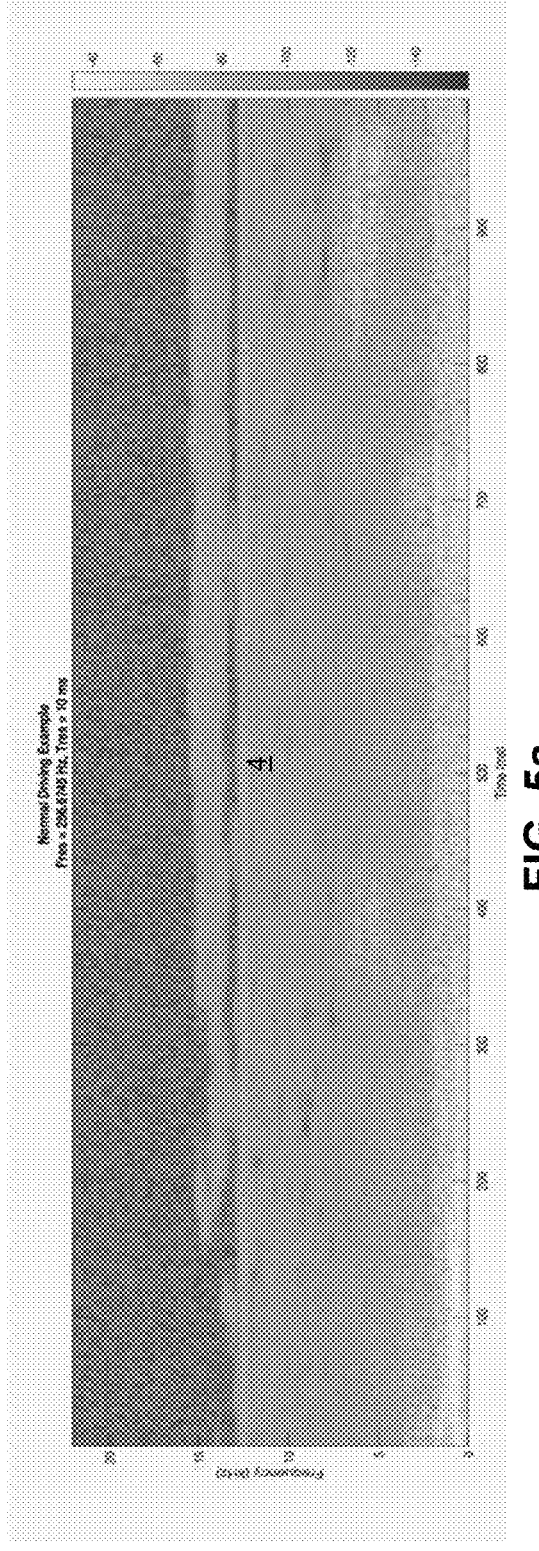
FIG. 5a shows a time-frequency spectrogram typical of sound recorded inside a vehicle during normal operation (i.e. in the absence of accidents, or other vehicle integrity-related events)
Figure 5B:
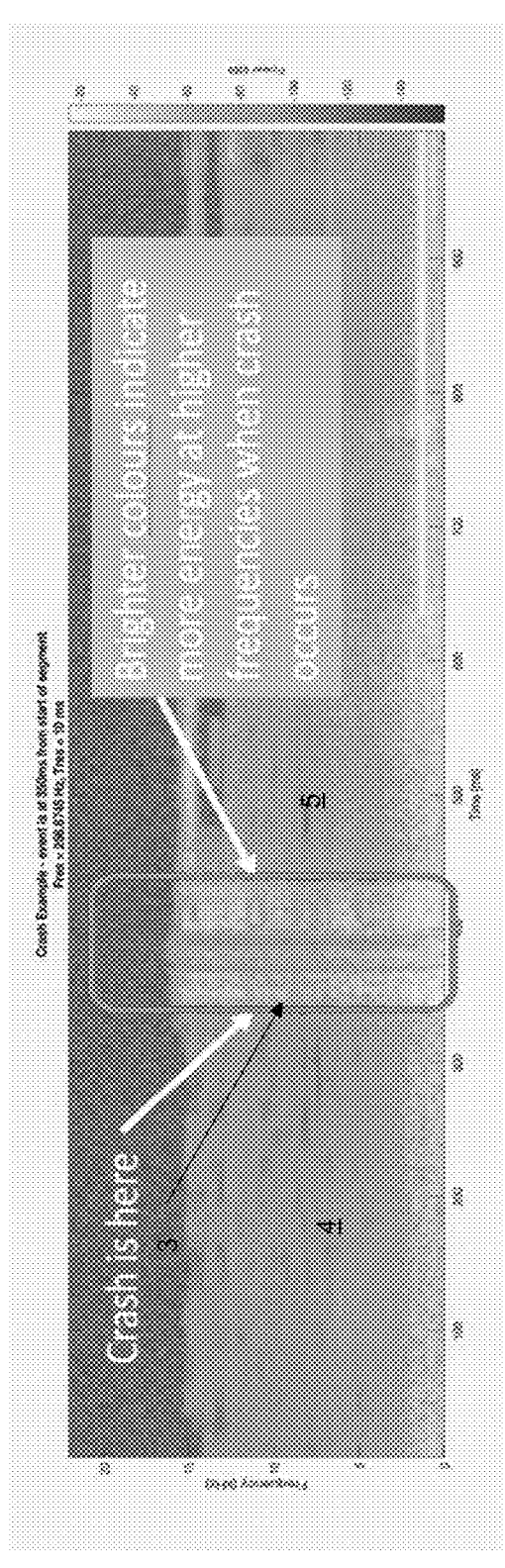
FIG. 5b shows a spectrogram typical of sound recorded inside a vehicle before, during and after another oblique-type collision event between two vehicles, similar to the events referred to in connection with FIGS. 1 and 4.

FIGS. 5a and 5b remark the difference in the spectral profiles between periods of 'normal' driving (such as is shown by FIG. 5a and region 4 of FIG. 5b, corresponding to the time prior to the crash event) and times when an impact occurs 3 (at around 350 ms in FIG. 5b and lasting for about 100 ms, i.e. for a relatively shorter event, compared to the impact of FIG. 4) or immediately thereafter, as shown by region 5 of FIG. 5b, corresponding to a time period after the vehicles 1, 2 have disengaged—even when account is taken of common, potential sources of errors such as random events such as spoken words, music from a radio, etc.—all of which are only responsible for very little energy in the picked-up sound at the higher frequencies.

By itself, the above phenomenon would only be of relative interest if used, for example, in connection with a battery-powered device relying on a Digital Signal Processor (DSP), as the DSP would need to continuously compute the spectrogram to compare against spectra obtained during normal driving 4, which would require a high level of processing power. This can be provided for, for example, by supplying power to the digital signal processor via the vehicle engine (electrical, thermal or hybrid) or other power unit that belongs to the vehicle in question, i.e., a vehicle in which a device configured to carry out the method described herein is provided, such as the device shown in FIG. 12c (for which, see below). However, this would also be extremely wasteful from a power perspective, as the events of interest in this disclosure are relatively rare (it is not uncommon not to have accidents, nor other vehicle integrity-related events, for very extended periods of time, such as months or even years). As the primary difference in sound between moments of normal or no driving and relatively low-power events, such as oblique-type impacts, is determined by the relatively higher presence of the higher frequency components (especially, those above 10 kHz), due to the Nyquist principle of digital signal sampling, to be able to adequately record frequencies up to 22 kHz, a digital audio signal would need to be sampled at 44 kHz or higher, meaning that the Analog to Digital (A/D) processing associated to any conventional DSP operations would consume way too much power to make a battery-powered device feasible. Acceptable battery-powered devices would be, in fact, normally required to have battery lives well in excess of 12 months—and this would be extremely difficult or expensive to achieve.

By contrast, according to the present disclosure, it is possible to use a fully analog processor (such as the RAMP™ chip manufactured by Aspinity™ Limited, at the time of writing available from website www.aspinity.com) which can process the acquired sound fully in the analog domain, thus removing the need to convert analog audio data into digital audio data suitable for a DSP to process.

Figure 6:
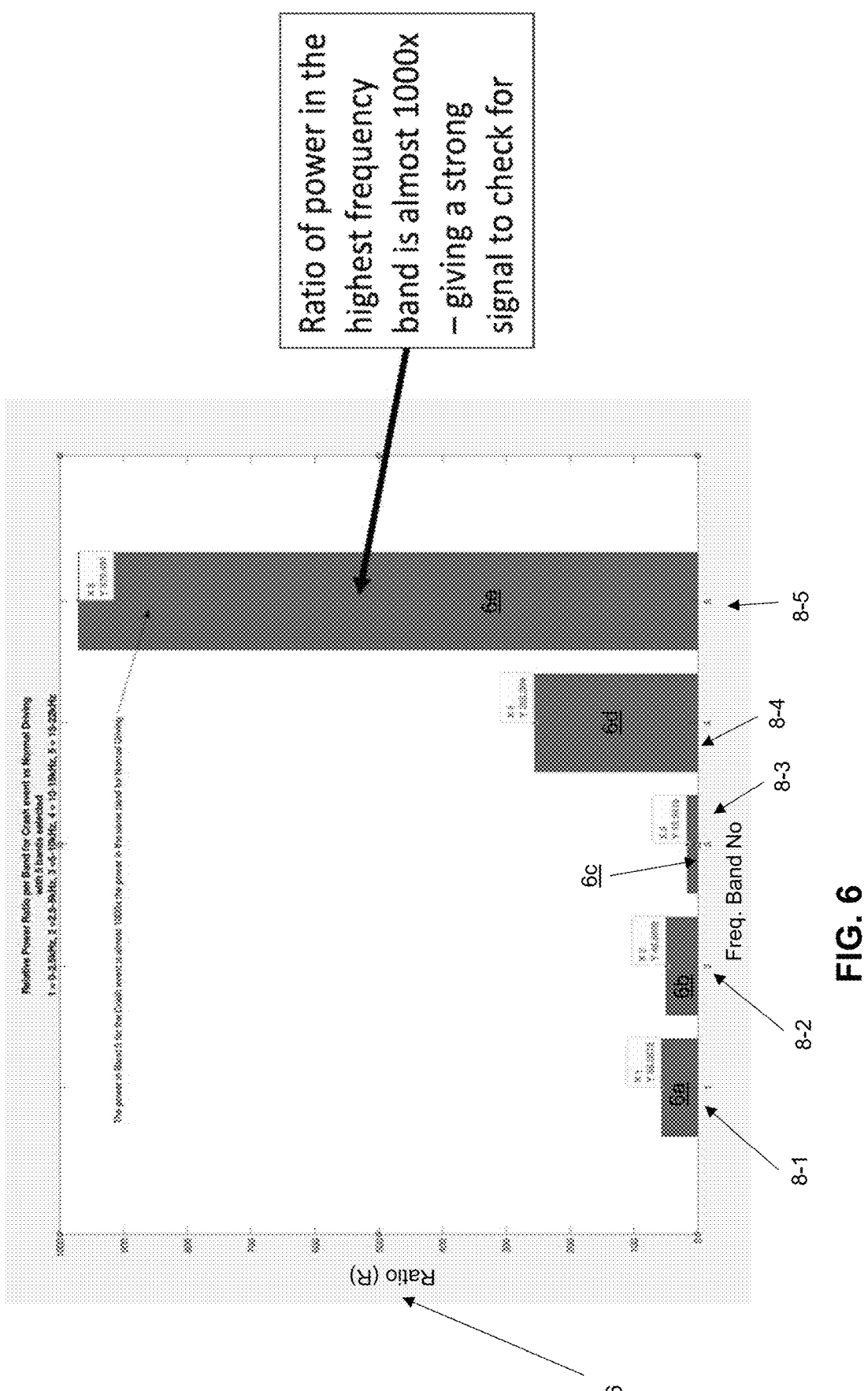
FIG. 6 shows, for each of five arbitrarily selected frequency bands, a ratio R between Power Spectral Density (PSD) during and before the crash event.
Figure 7:
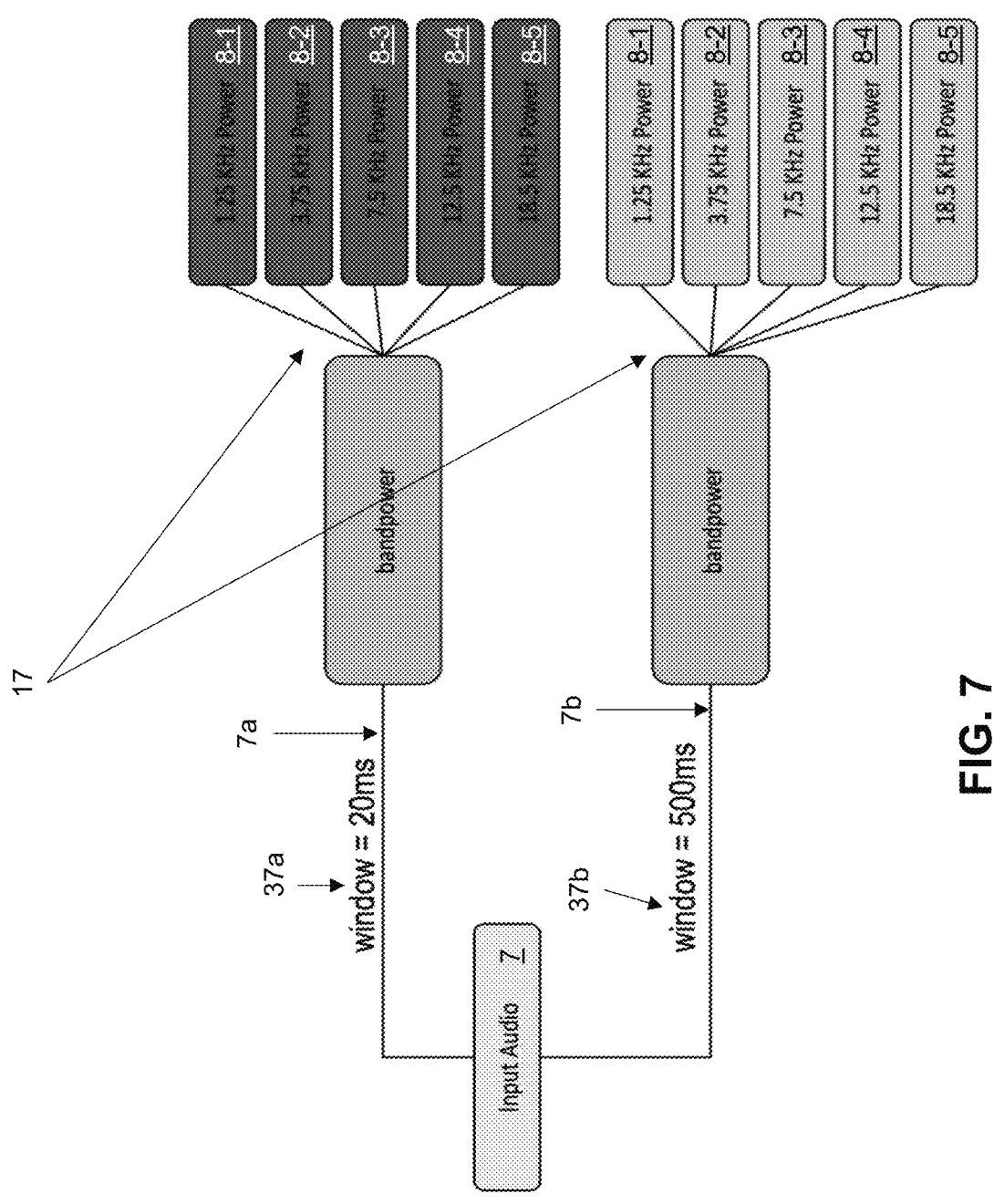
FIG. 7 is a flow-chart representing the process of first segmenting in time (using two different time windows), and then decomposing an analog audio signal into individual frequency bands.
Figures 9A, 9B:
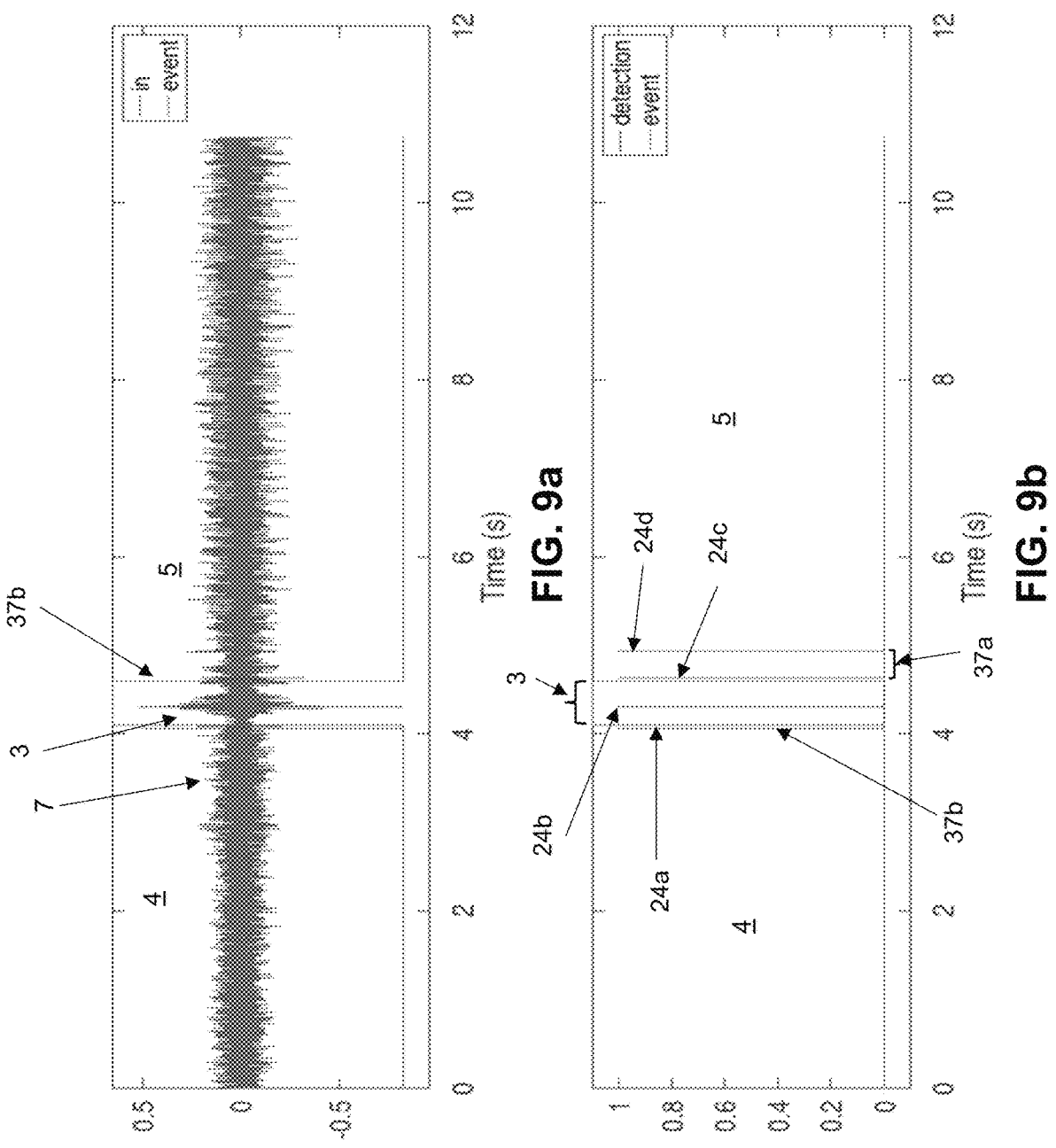
FIG. 9a shows an analog audio signal as picked up by a microphone located inside a vehicle in connection with an oblique-type crash event, similar to those referred to in connection with FIGS. 1, 4 and 5b.
FIG. 9b shows a processing of the audio signal of FIG. 9a, as described herein.

As shown in FIG. 6, our initial analysis of the data focused on comparing energies, in this particular instance defined as Power Spectral Density (PSD) ratios 6a, 6b, 6c, 6d, 6e, within each of several predetermined frequency bands 8-1, 8-2. 8-3, 8-4, 8-5, within the frequency range of interest. By looking at the sum of the PSD for each signal component in each band, in a given time window 37 (some time windows 37 as described herein are shown in FIGS. 7, 9a and 9b, respectively), and dividing this sum by the equivalent value measured in a previous time window 37 prior to the crash, a ratio 6 can be calculated as shown in FIG. 6. When a collision occurs, the ratio 6 in the higher frequency bands above 10 kHz (i.e., frequency bands 8-3, 8-4 and 8-5 in FIG. 6) becomes significantly higher. As the aforementioned analog processor 25 is able to carry out this entire process in the analog domain, or, in other words, fully analogically, the current consumed by the analog processor 25 (i.e., the current drawn by the analog processor 25, at a given voltage) to perform this calculation has been estimated to be in the order of 8 microampere (μA).

The design of the analog pathway on the RAMP™ chip 25 splits the incoming analog audio signal 7 into a number of separate channels, each of which is associated to a predetermined (but settable and programmable) frequency band 8. The process 17 of signal decomposition into components in associated frequency bands is referenced in both FIGS. 7 and 10. Each channel 8 is analyzed within the analog domain without any digitization of the data at this point. In order to achieve the comparison shown in FIG. 6 between normal driving conditions versus a crash event, the analog audio signal 7 is processed by the analog signal processor 25 in parallel over a pair of relatively shorter and longer time windows 37, respectively of the duration of 20 ms 37a & 500 ms 37b, as exemplified by the two parallel lines of processing in FIG. 7.

FIG. 7 is only offered as an example of how the analog audio signal 7 may be treated by the analog signal processor 25, and this example will from now on be referred to as "idealized model". This model uses 20 ms and 500 ms windows 37a, 37b, and five predetermined frequency bands 8 centered around, respectively, 1.25 kHz, 3.75 kHz, 7.5 kHz, 12.5 kHz and 18.5 kHz. It will be appreciated that different parameters and settings may be used by the skilled person, which would correspond to different models. In FIG. 7, the channels along which the analog audio signal 7 is decomposed are respectively associated to corresponding predetermined frequency bands 8-1, 8-2, 8-3, 8-4 and 8-5. The analog signal processor 25 in parallel applies time windowing to the same signal 7 using said shorter and longer temporal windows 37a, 37b. For the sake of example, we shall now assume that the idealized model is deployed on the RAMP™ chip 25 introduced above. Further programmable, adaptable settings related to the processing of the analog audio signal 7 by the RAMP™ chip 25 are presented in connection with FIG. 8.

Figure 8:
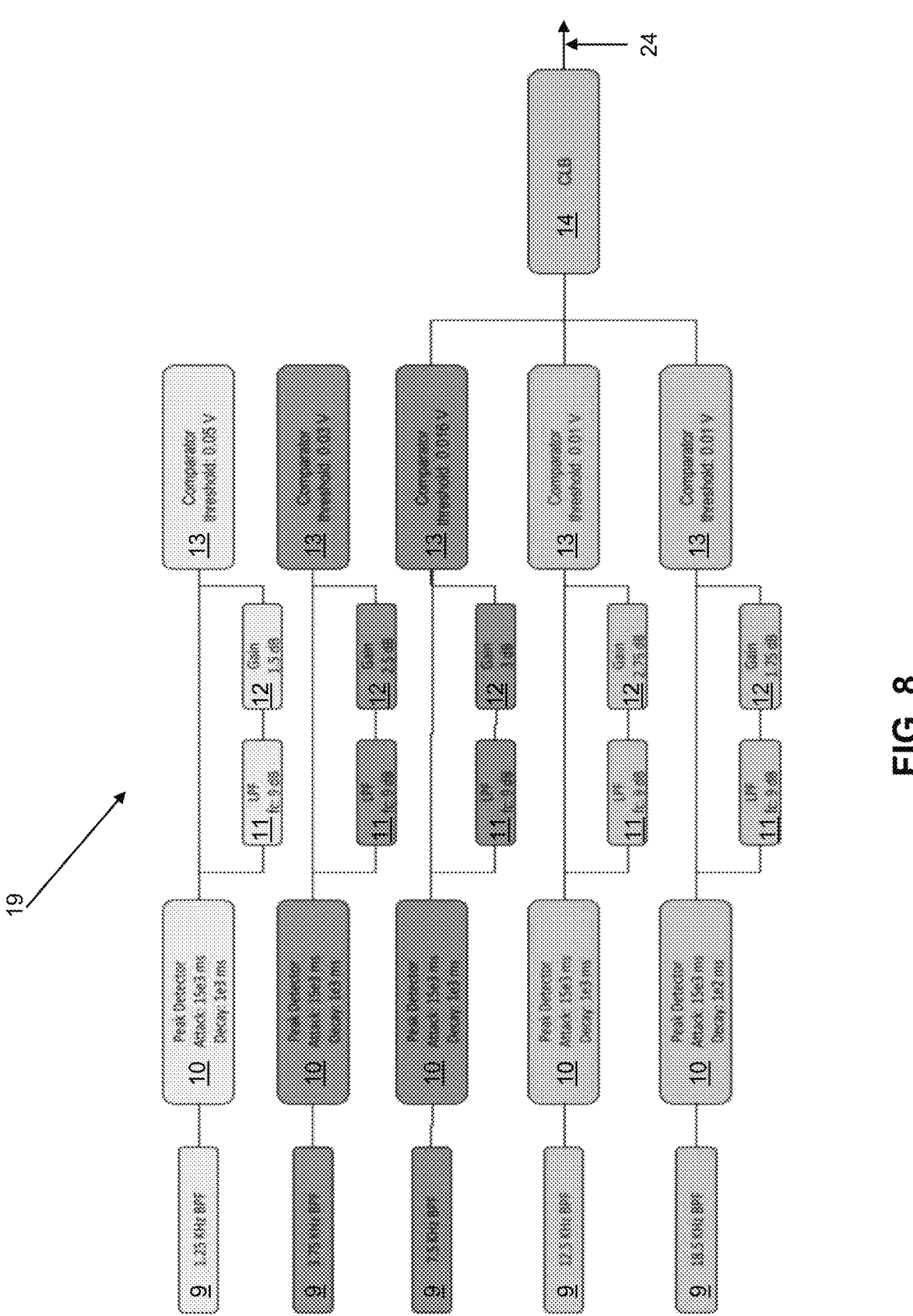
FIG. 8 is a flow-chart representing the process of comparing the individual audio signal components referred to in connection with FIG. 7, for the two different time windows, and outputting a detection signal based upon said comparison.
Figure 10:
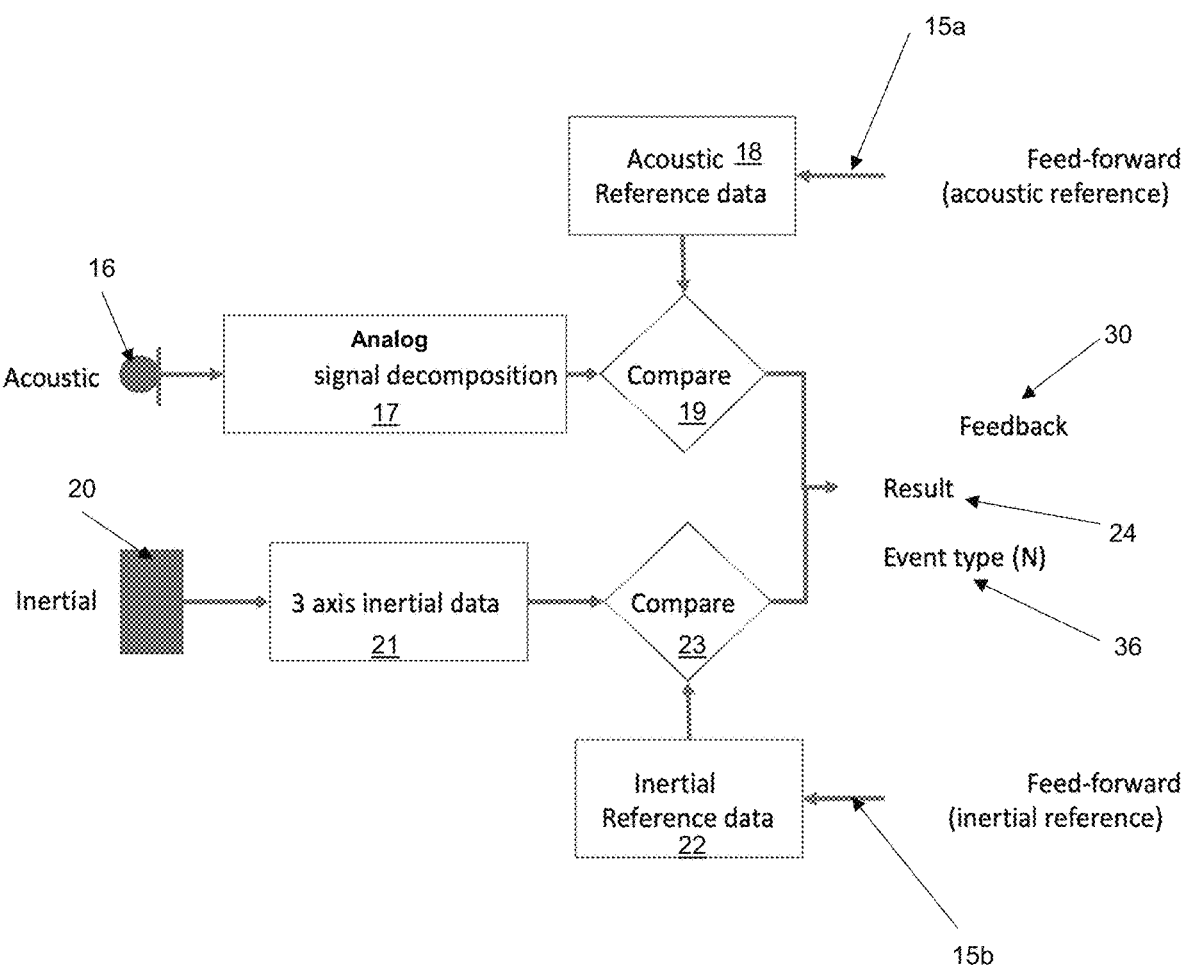
FIG. 10 is a flow-chart representing a method as described herein, comprising acoustic and inertial data comparisons.

The process 19 of comparing the frequency content of the various signal components is referenced in FIGS. 8 and 10. As shown in FIG. 8, the idealized model makes use of a Peak Detector 10 to process the incoming windowed analog audio signals 7a, 7b. A peak, that is a maximum of a signal envelop, is established by the Peak Detector 10 every 20 ms in connection with audio signal 7a and every 500 ms in connection with audio signal 7b. Only for audio signal 7b, the Peak Detector 10 acts in combination with a Low Pass Filter (LPF) 11 and Gain Block 12 (this is, essentially, a signal amplifier). The signal is conditioned by the LPF 11 and GB 12 to better represent background conditions in the absence of a crash event. A Comparator 13 is used to create an output for each audio signal component, which is associated, as explained above, to a respective frequency band 8. Such a decomposition is carried out, in this example, by band-pass filters (BPFs) 9 visible on the left-hand side of FIG. 8.

With continued reference to FIG. 8, the outputs related to the signal components with the three highest frequency bands, that is bands 8-3, 8-4, 8-5, are fed into a Combinatorial Logic Block (CLB) 14 which acts as a logical 'AND'. The CLB 14 only creates an output signal when the three highest power bands 8-3, 8-4, 8-5 simultaneously show significant differences due to the presence of a crash event, and therefore the presence of a different spectrogram between normal driving conditions and during a crash event. As discussed above, this is a good indicator of a collision event 3 having occurred. The output 24 from the RAMP™ chip 25 therefore becomes a simple digital I/O pin 24 (this is shown, as an example, in FIG. 9b) which goes 'high' when a crash is detected.

The results of running the aforementioned idealized model on the RAMP™ chip 25 can be seen in FIGS. 9a and 9b. FIGS. 9a and 9b show the analysis of an audio signal 7 from the crash shown in FIG. 1. In FIG. 9a, we can recognize the audio input signal 7 (mostly due to the noise of the diesel-powered van 2) and the manually added longer timeframe window (duration 500 ms) 37b applied during the time period 3 when the crash event occurs, just around four seconds from the start. FIG. 9b shows outputs of the RAMP™ chip 25 in the form of digital I/O pins 24a, 24b, 24c, 24d during the crash event, with positive crash detection clearly accomplished by the system. It will be appreciated that, in accordance with the parallel analysis shown by FIGS. 7 and 8, which used shorter and longer temporal windows 37a, 37b, detection is output by the RAMP™ chip 25 multiple times (precisely four times) during the crash event 3. Accordingly, the example of FIG. 9b uses a shorter time window 37a (for peak detection) of the duration of approximately 125 ms. In a real application, it would of course be preferable to latch the first positive-detection output 24a of the RAMP™ chip 25 for a defined period of time. This latching is not shown in FIG. 9b.

Figure 11:
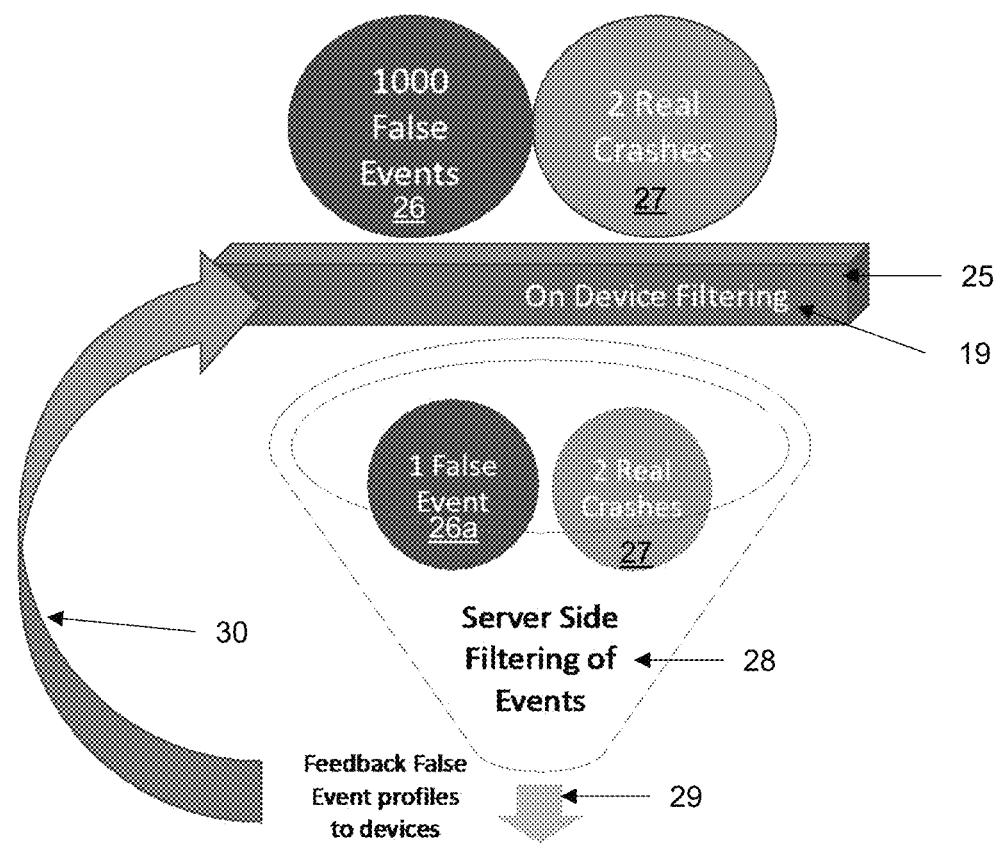
FIG. 11 illustrates selectively filtering between positive and false crash events, as described herein.

As shown in connection with FIG. 10, the analog audio signal processing on the RAMP™ chip 25 (or other equivalent analog signal processor 25) could be combined with similar processing from an existing, conventional (digital) event-detection circuit comprising an accelerometer 20 as a sensor (this processing line can be seen in the lower half of FIG. 10), to create a system with two parallel lines of processing, each dedicated to a respective sensor, which can be used to either only perform a positive detection when both outputs are triggered highs, or in more subtle and nuanced ways. Although FIG. 10 refers to a 3-axis accelerometer 20, a 6-axis Inertial Motion Unit (IMU) could be used, and this would be simply accomplished starting from the set-up shown in FIG. 10 by adding a 3-axis gyroscope's input. For example, when the acoustic signal processing line identifies a crash event, but the accelerometer signal processing line doesn't, this particular event 26a could be sent to the servers for further analysis, as shown in FIG. 11.

In FIG. 10, the upper, acoustic processing line starts with the microphone 16. Then, the analog audio signal is decomposed 17, as shown in FIG. 7. Afterwards, the frequency components are compared 19, as shown in FIG. 8. The comparison 19 may be carried out against acoustic reference data 18, which may be part of the idealized model mentioned above, or the model can be changed or adapted, for example using one or more acoustic feed-forward parameters 15a, as also shown in FIG. 10.

With continued reference to FIG. 10, the lower, inertial processing line starts with the accelerometer 20. Then, the (digital) inertial signals 21 are acquired and compared 23 against inertial reference data 22. The inertial reference data 22 may be changed or adapted, for example using one or more inertial feed-forward parameters 15b, as also shown in FIG. 10.

Finally, on the output side of FIG. 10, we see not only the event detection 24, but the comparisons 19, 23 may also be used for event categorization 36 and/or the generation of one or more feedback parameters 30, which can be used to adapt the model and/or create new models for different vehicle integrity-related events.

As shown in FIG. 11, the methods and apparatus/system described herein may act as a combination of a highly selective false positive suppression layer 19, 25 but also as a way to extract events 26a which have not previously been recognized and to pass them back to the analog signal processor 25 in the form of a parameterized file, which can also be considered as part of the aforementioned feedback parameters 30, which could then allow the suppression of any false positives, such as event 26a (in the case that this particular event was indeed a false positive), to be increased and the identification of real crashes to be further enhanced.

Figure 12C:
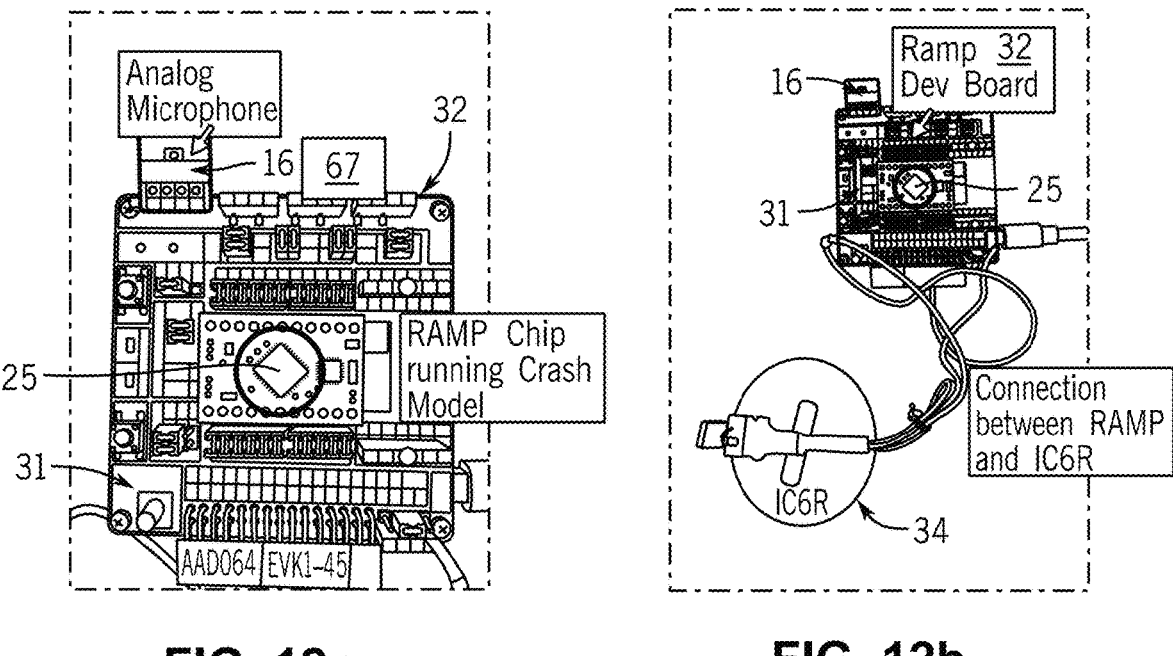
FIG. 12c is a schematic representation of a telematic device as described herein.
Figure 12C:
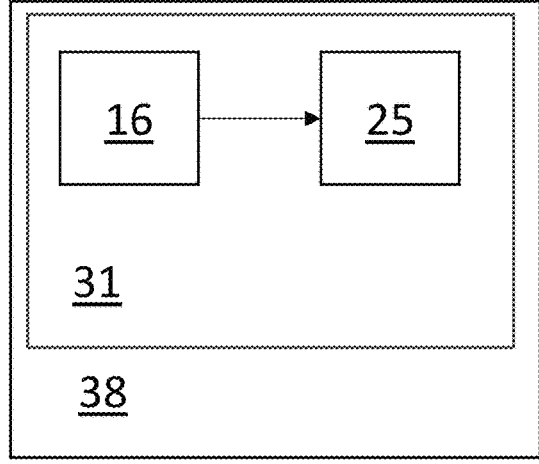

An example of an early build of apparatus adapted to carry out the methods described herein is shown in FIG. 12a, which shows a RAMP™ chip 25 installed on the printed circuit board (PCB) 31 of a development device 32 for developing the models described herein. FIG. 12a also shows the sensor used in the described examples, which is a conventional analog microphone 16, as known in the prior art. FIG. 12a also shows schematically the optional provision of an analog vibration sensor 67 mounted on the chip 25. In this case, the vibration sensor 67 is a piezoresistive vibration sensor 67, though different types could in principle be used. The vibration sensor 67 is capable of measuring vibrations that propagate through the vehicle, so long as it is directly or indirectly mounted to a structural component of the vehicle. In the example shown in FIG. 12a, the vibration sensor 67, disposed on the chip 25, will be indirectly coupled to the windscreen of the vehicle, via the chip 25 itself, on which it is mounted. The chip 25 will be part of a telematic device 38 mounted to the windscreen of the vehicle, though other mounting locations are of course possible. Alternatively, the vibration sensor 67 could be directly mounted on said windscreen. In this scenario, the vibration sensor 67 could be in operable connection with the chip 25 via a wire (though the connection could be, of course, wireless). The output from the RAMP™ chip 25 could be fed directly to an IC6R communication device 34 (a conventional telematic communication device) normally used by usage-based insurance providers, as shown in FIG. 12*b*. An alternative arrangement of this apparatus would have the RAMP™ chip 25 and the microphone 16 directly embedded onto the PCB of the IC6R device 34. This is shown, albeit just schematically, in FIG. 12*c*. Although we have mentioned IC6R communication devices so far through this document, that is just one type of communication device possible, and implementations are possible using other communication device types such as the IC7 range of devices.

The solution can be further extended by simultaneously running several other models on the same RAMP™ chip 25, programmed to detect characteristic audio events such as:

the sound of glass breakage for the detection of thefts from vehicles, or potential break-ins or acts of vandalism; and/or, the sound of an angle grinder (or a reciprocating saw, just as an additional example) used to cut metal—this being used increasingly for thefts from vans with deadlocks and for cutting through bicycle locks as described in a report from an attempted theft in June 2022, available from URL https://road.cc/content/news/thief-attempts-steal-labour-mps-bike-293711, at the time of writing; and/or the sound of usually minor damage, such as two wing mirrors coming together, which event may be of particular importance in the case of contact between a vehicle and a motorcyclist (or scooter rider). In this case, the seriousness of the incident may have immediately to be escalated from it being a minor incident to something quite serious, especially if the accident involves an autonomous vehicle.

This additional layer of security can then be used to trigger deterrent measures or to alert relevant persons to the crime being committed.

In the present disclosure, we have described a method and corresponding apparatus, including telematic systems, that bring forward a solution that does not rely upon the transmission of any acquired audio data. The acquired audio data are processed by the analog processor 25, inside the telematic device 38: this preserves privacy. The telematic device 38 will usually be affixed to a vehicle and will not be placed, for example, in a mobile phone belonging to a driver or passenger of said vehicle. Further, the telematic device 38 will be battery powered and it will have the capability of processing acquired sound throughout an extremely long life due to extremely low power consumption. Arrangements that require intensive battery usage, such as smartphones or other A/D conversion-based devices, are less preferred, but also part of the present disclosure. However, the fully analog implementation is to be preferred, since this solution is fully self-contained (in that it requires virtually no power, and it can therefore operate virtually continuously), and it protects a vehicle whilst preserving the privacy of the occupants. Nevertheless, digital signal processing could still be used, if its power requirements can be fulfilled. This can be the case if a large enough power source is used, such as a vehicle engine or power battery, such as standard 12V vehicle batteries. While we have discussed implementing the method in the analog or digital domains, the skilled person will also recognize that a partially-analog, partially-digital implementation can also be adopted. Another notable advantage related to the disclosure set forth herein is that only detection events are communicated to the associated server.

Finally, FIGS. 13 and 14 are included to show shows speed, acceleration (in the X and Y directions) and vibration signals recorded during two types of events, namely: a side-scrape contact, with-mirror-contact vehicle integrity-related event, and a stone chip vehicle integrity-related event on a windscreen of a moving-car. In FIG. 13, the event happens just after 15:40:52 hours (this is a day time expressed in hours, minutes and seconds, respectively). In FIG. 14, the event happens just after 15:59:44. In both Figures, the first graph represents vehicle speed. As can be seen, in the case of FIG. 13 the vehicle comes to a stop after gaining speed and travelling for about eight seconds at low speeds in the region of 10-15 miles an hour. In the case of FIG. 14 the vehicle comes to a stop after travelling for about nine or seconds at a generally constant speed at around 18 miles an hour.

The second graph in each of FIGS. 13 and 14 represents the corresponding X and Y accelerations 21. Whilst the side-scrape event of FIG. 13 appears to have been slightly sensed by the accelerometer in either the X or Y direction, the stone chip event of FIG. 14 has been clearly missed by the accelerometer. On the contrary, the vibration data 66 shown in the third graph from the top on each Figure reveal that the vibration sensor 67 has been able to pick up both events.

The third graph from the top on each of FIGS. 13 and 14 also include respective 'detection' traces derived as described herein, from the audio data 7 captured by the microphone 16, as processed by the analog signal processor 25. A positive detection 24 of the respective events may be seen at around 15:40:52 hours in FIG. 13 and just after 15:59:54 hours in FIG. 14. It will be appreciated that there is good correlation in the detection of the events between the vibration sensor 67 and the microphone 16. It is suggested that this feature may also be used to reduce false positives. A positive detection outcome 24 from the microphone 16, for example, may accordingly only be taken as true if the vibration sensor 66 has also been triggered.

LIST OF REFERENCES

1 Stationary vehicle
2 Travelling vehicle
3 Accident time
4 Time period prior to accident event
5 Time period after accident event
6 Spectrum Power Density (SPD) Ratio
6*a*, 6*b*, 6*c*, 6*d*, 6*e* SPD Ratios within predetermined frequency bands
7 Analog audio signal (in a different implementation this could be a digitized audio signal)
7*a*, 7*b* Time-windowed analog audio signals
8 Frequency band
8-1, 8-2, 8-3, 8-4, 8-5 Predetermined frequency bands (idealized model)
9 Bandpass filter (BPF)
10 Peak/envelop detector (PD)
11 Lowpass filter (LPF)
12 Gain bank (GB, or 'amplifier')
13 Comparator
14 Combinatorial Logic Block (CLB)
15 Feed-forward parameter
15*a* Acoustic feed-forward parameter
15*b* Inertial feed-forward parameter
16 Microphone
17 Analog signal decomposition (in frequency bands)
18 Acoustic reference database
19 Comparing acoustic data
20 Three-axis accelerometer
21 Accelerometer signals

13

22 Inertial reference database
23 Comparing inertial data
24 Output 1: event detection
24a Initial event detection
24b, 24c, 24d Subsequent event detections
25 Analog signal processor (in a different implementation, this could be a digital signal processor)
26 False events (i.e. false positives)
26a Potential false event
27 Actual events (i.e. events relevant to vehicle integrity, such as real oblique-type accidents)
28 Server-side filtering of detected events
29 Output 2: detected events notified to client
30 Feedback to analog signal processor
31 Printed circuit board (PCB)
32 Development device
33 Events notified to client
34 IP6R telematic communications module
36 Output 3: event categorization
37 Time window
37a, 37b Relatively shorter/longer time windows
38 Telematic device (as described herein)
67 Vibration sensor
66 Vibration data
The invention claimed is:

1. A method of detecting an event related to vehicle integrity, the method comprising:
   providing a microphone inside a vehicle;
   using said microphone, continuously generating an analog audio signal;
   providing an analog signal processor also inside said vehicle, associated to said microphone;
   using said analog signal processor,
      computing a time-frequency spectrogram of said analog audio signal, wherein said computing comprises dividing said analog audio signal into a plurality of time segments, and decomposing said time segments of the analog audio signal into a plurality of signal components in predetermined frequency bands;
      wherein said dividing the analog audio signal into a plurality of time segments is performed in parallel on the same audio signal according to at least two temporal windows having different durations; and,
      using said analog signal processor, evaluating said time-frequency spectrogram to detect said vehicle integrity-related event,
   whereby at least the computing and evaluating are fully carried out in the analog domain, and without digital signal processing.
2. The method of claim 1, wherein said predetermined frequency bands are non-overlapping and are sequentially disposed within the frequency range 0 to 22.5 kHz.
3. The method of claim 2, wherein said frequency bands are centered at one or more of: 1.25 kHz; 3.75 kHz; 7.5 kHz; 12.5 kHz and 18.5 kHz.
4. The method of claim 1, wherein said computing a time-frequency spectrogram comprises calculating a power spectral density for each of the plurality of time segments and signal components.
5. The method of claim 1, wherein said decomposing the time segments of the analog audio signal into a plurality of signal components in predetermined frequency bands comprises analog band-pass filtering.
6. The method of claim 5, wherein said evaluating the time-frequency spectrogram to detect said vehicle integrity-related event comprises detecting a peak for each time segment and/or signal component of the analog audio signal.

7. The method of claim 6, wherein said detecting a peak is carried out in connection with a first temporal window of the at least two temporal windows, having a duration shorter than a second temporal window of the at least two temporal windows.
8. The method of claim 7, wherein said evaluating the time-frequency spectrogram to detect said vehicle integrity-related event comprises low-pass filtering and amplifying each time segment and/or signal component of the analog audio signal.
9. The method of claim 8, wherein said low-pass filtering and amplifying is carried out in connection with the second temporal window, the second temporal window having a duration longer than the first temporal window.
10. The method of claim 9, wherein said evaluating the time-frequency spectrogram to detect said vehicle integrity-related event comprises comparing the peaks detected in connection with the first temporal window with the peaks detected in connection with the second temporal window.
11. The method of claim 10, wherein comparing said peaks comprises determining whether a difference between said peaks exceeds a predetermined threshold.
12. The method of claim 11, wherein said predetermined threshold varies depending on a frequency band of the predetermined frequency bands associated with the evaluated signal component.
13. The method of claim 10, wherein said evaluating the time-frequency spectrogram to detect said vehicle integrity-related event comprises selecting one or more signal components corresponding to one or more high frequency bands of the predetermined frequency bands.
14. The method of claim 1, further comprising providing acoustic reference data for carrying out said evaluating.
15. The method of claim 14, further comprising updating said acoustic reference data by supplying an acoustic feed-forward parameter representative of a specific vehicle integrity-related event.
16. The method of claim 1, further comprising:
   providing an accelerometer, also associated to said vehicle, microphone and analog signal processor;
   using said accelerometer, generating analog inertial data related to motion of the vehicle; and,
   using the analog signal processor, assessing said inertial data to detect said vehicle integrity-related event.
17. The method of claim 16, further comprising providing inertial reference data for carrying out said assessing.
18. The method of claim 17, further comprising updating said inertial reference data, for example by providing an inertial feed-forward parameter representative of a specific vehicle integrity-related event.
19. The method of claim 1 further comprising:
   providing a vibration sensor rigidly mounted, directly or indirectly, to a structural element of the vehicle;
   using said vibration sensor, generating analog vibration data related to vibration of the vehicle; and,
   using the analog signal processor, assessing said vibration data to detect said vehicle integrity-related event.
20. The method of claim 19, wherein said vehicle integrity-related event is confirmed and/or recorded as having taken place only if both the assessments of the audio and vibration data carried out by the analog signal processor are positive.
21. The method of claim 19, further comprising categorizing the detected vehicle integrity-related event according to said inertial data and/or according to said vibration data.

22. The method of claim 21, further comprising outputting one or more feedback parameters for updating said evaluating the time-frequency spectrogram.

23. Apparatus for detecting the event related to vehicle integrity, the apparatus being adapted to carry out the method of claim 1 and comprising:

the microphone adapted to continuously generate an analog audio signal; and the analog signal processor configured to:

compute the time-frequency spectrogram of said analog audio signal, wherein said computing comprises dividing said analog audio signal into the plurality of time segments, and decomposing said time segments of the analog audio signal into the plurality of signal components in the predetermined frequency bands; and, evaluate said time-frequency spectrogram to detect said vehicle integrity-related event.

24. A telematic device for continuous vehicle monitoring for insurance purposes, the telematic device comprising the apparatus of claim 23.

25. A telematic system comprising the telematic device of claim 24.

26. A vehicle comprising the apparatus of claim 23, wherein said apparatus is located inside a passenger cabin of the vehicle.

\* \* \* \* \*